(12) United States Patent
Kumar (10) Patent No.: US 10,073,686 B1
(45) Date of Patent: Sep. 11, 2018

(54) FUNCTION SERIALIZATION FOR INTER-THREAD MESSAGING

(71) Applicant: SAP SE, Walldorf (DE)

(72) Inventor: Viren Kumar, Vancouver (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/673,757

(22) Filed: Aug. 10, 2017

(51) Int. Cl.
*G06F 9/44* (2018.01)
*G06F 8/51* (2018.01)
*G06F 9/455* (2018.01)
*G06F 9/54* (2006.01)

(52) U.S. Cl.
CPC ............ *G06F 8/51* (2013.01); *G06F 9/45529* (2013.01); *G06F 9/546* (2013.01)

(58) Field of Classification Search
None
See application file for complete search history.

(56) References Cited

U.S. PATENT DOCUMENTS

| | | | |
|---|---|---|---|
| 6,226,692 B1* | 5/2001 | Miloushev | G06F 8/36 719/316 |
| 6,704,804 B1* | 3/2004 | Wilson | G06F 9/465 719/315 |
| 2004/0154020 A1* | 8/2004 | Chen | G06F 9/5027 718/107 |
| 2005/0071809 A1* | 3/2005 | Pulley | G06F 9/4488 717/108 |
| 2008/0244576 A1* | 10/2008 | Kwon | G06F 9/5016 718/1 |
| 2009/0307308 A1* | 12/2009 | Siegemund | G06F 8/443 709/203 |
| 2013/0117326 A1* | 5/2013 | De Smet | G06F 9/4488 707/798 |
| 2014/0245134 A1 | 8/2014 | Portnoy et al. | |
| 2016/0170722 A1* | 6/2016 | Evans | G06F 8/35 717/104 |
| 2017/0329578 A1* | 11/2017 | Iscen | G06F 9/4831 |

OTHER PUBLICATIONS

"Communication: The Extended European Search Report", dated Jul. 20, 2018 (Jul. 20, 2018), European Patent Office, for European Application No. 17002026.7-1221, 9pgs.

* cited by examiner

*Primary Examiner* — Philip Wang
(74) *Attorney, Agent, or Firm* — Buckley, Maschoff & Talwalkar LLC (57) ABSTRACT

A system includes reception of a request from a first execution thread to post a message to a second execution thread, a payload of the message comprising an object including a function and serialized text of the function, and, in response to the request, deletion of the function from the object to create a modified object, and calling of a method to post a second message to the second execution thread, a payload of the second message comprising the modified object and the serialized text of the function. A request is received from the second execution thread to handle the second message, the serialized text of the function is deserialized, and the deserialized text of the function is inserted into the modified object to generate a fourth object.

20 Claims, 9 Drawing Sheets

FUNCTION SERIALIZATION FOR INTER-THREAD MESSAGING

BACKGROUND

Conventional virtual machines are designed to execute computer programs in a platform-independent environment. A virtual machine may utilize two or more execution threads (e.g., a main thread and one or more worker threads) to execute a computer program. A virtual machine may provide a protocol to post a message including a payload between two execution threads. The message payload may comprise an object, however, in the case of many virtual machines (e.g., a JavaScript Runtime Environment), the payload object is not permitted to include a function within its definition. Payloads passed between execution threads are therefore limited to "pure" objects (e.g., JavaScript Object Notation objects).

In order to post a function-containing object between execution threads, a developer is required to manually generate a serialized form of the object which omits any functions of the object. Manually generating the serialized form is onerous, error-prone and robs the subsequently-transferred object of its functionality at the receiving execution thread.

DETAILED DESCRIPTION

The following description is provided to enable any person in the art to make and use the described embodiments. Various modifications, however, will remain readily-apparent to those in the art.

Generally, some embodiments support the transfer of objects including one or more functions between execution threads of a virtual machine. According to some embodiments, object functions are deleted prior to transfer of an object between execution threads, and the object functions are recreated within the object at the receiving thread. More particularly, some embodiments employ compile-time and runtime components to annotate a function-containing object at compile time, serialize the object based on the annotations in a manner that preserves the function definition and allows the object to be transferred between execution threads, and deserialize the object based on the annotations on the receiving end to recreate the function definition, context and state.

Figure 1:
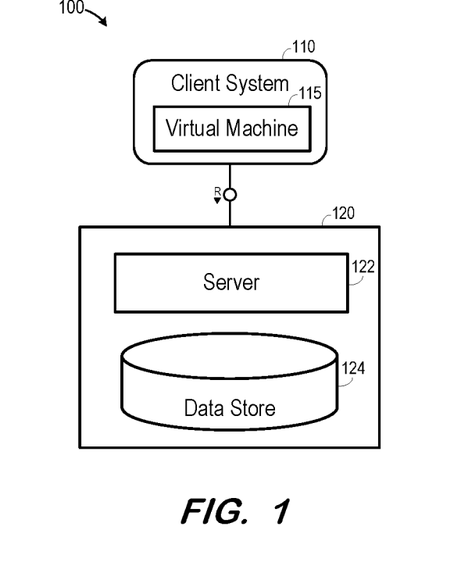
FIG. 1 is a block diagram of a system architecture according to some embodiments.

FIG. 1 is a block diagram of system 100 according to some embodiments. Embodiments are not limited to the FIG. 1 system. System 100 includes client system 110 and backend system 120. According to some embodiments, client system 110 may execute an application within virtual machine 115 to access data and functionality of backend system 120. Execution of the application may include the transfer of function-containing objects between execution threads of virtual machine 115 as described below.

Virtual machine 115 supports two or more execution threads and may comprise a JavaScript Runtime Environment according to some embodiments. An execution thread is an independent path of execution through program code. When multiple threads execute, contemporaneously or not, the path of one thread through the same program code may differ from the path of another execution thread.

In one particular example, server 122 of backend system 120 executes a server application to access data stored in data store 124, process the data, and provide the data to client system 115. Server 122 may comprise a Web server which communicates with a Web browser executing within client system 110 and, in turn, executing code of a Web application within virtual machine 115. Execution of the code of the Web application may result in the issuance of requests from client system 110 to backend system 120.

Server 122 may be separated from or closely integrated with data store 124 and its associated database management system (not shown). A closely-integrated server 122 may enable execution of applications completely on the database platform, without the need for an additional server. For example, according to some embodiments, server 122 provides a comprehensive set of embedded services which provide end-to-end support for Web-based applications. The services may include a lightweight web server, configurable support for Open Data Protocol, server-side JavaScript execution and access to SQL and SQLScript.

Data store 124 may comprise any data sources which are or become known, including but not limited to database views, spreadsheets, relational databases and/or OnLine Analytical Processing cubes. The data of data store 124 may be distributed among several relational databases, dimensional databases, and/or other data sources. Embodiments are not limited to any number or types of data sources.

Figure 2:
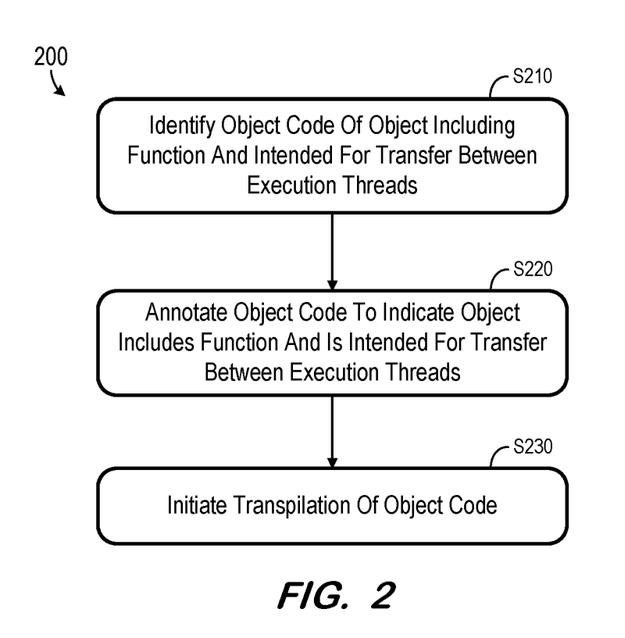
FIG. 2 is a flow diagram of a process according to some embodiments.

As mentioned above, several design-time actions are executed in order to support the runtime transfer of function-containing objects between execution threads. FIG. 2 comprises a flow diagram of design-time process 200 according to some embodiments. In particular, process 200 may be performed during development of object code.

In some embodiments, various hardware elements of a code development system execute program code to perform process 200. Process 200 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 3:
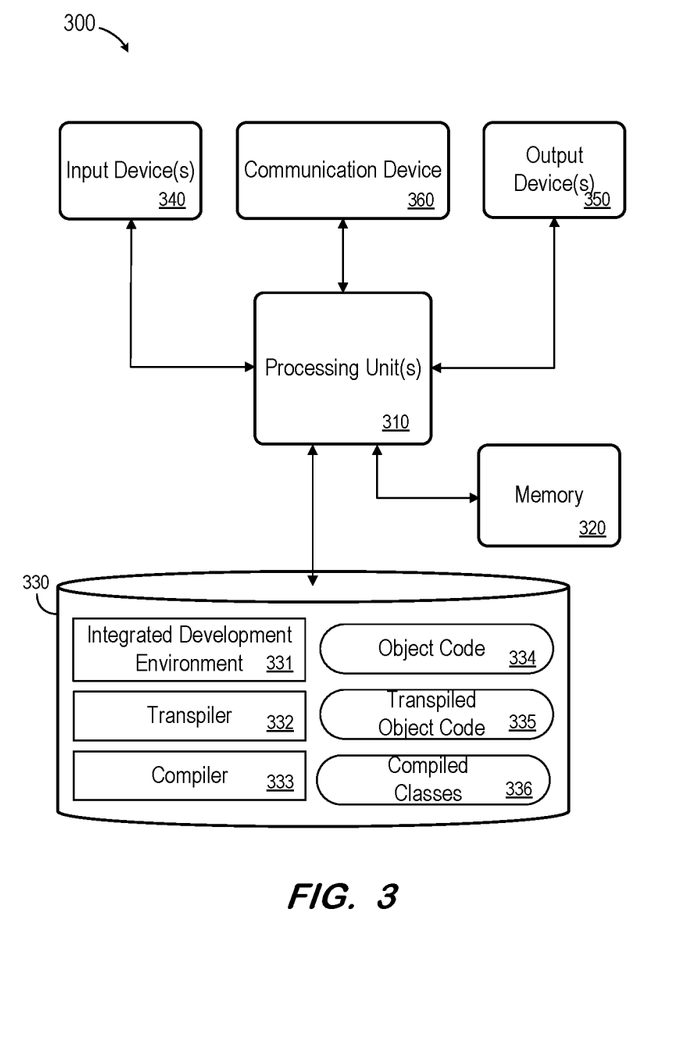
FIG. 3 is a block diagram of a design-time system according to some embodiments.

Initially, at S210, code of an object is identified. The identified code includes a function and is intended for transfer between execution threads. According to some embodiments, the identification at S210 is performed by a code developer and/or code development system. FIG. 3 is a block diagram of code development system 300 according to some embodiments.

System 300 includes processing unit(s) 310 and memory 320 storing code for execution by processing unit(s) 310. Processing unit(s) 310 may comprise any combination of microprocessor, controller, gate arrays, processor cores, or other hardware suitable to execute program code. Memory 320 may comprise random access memory, cache memory, or other suitable memory, and may comprise volatile, non-volatile, and/or storage-class memory (e.g., non-volatile random access memory).

Storage device 330 may comprise a fixed disk drive, a solid-state drive, a Flash drive and/or any other suitable storage medium. According to some embodiments, storage device 330 includes program code of various applications for loading into memory 320 and execution by processing unit(s) 310. For example, storage device 330 stores program code of integrated development environment 331. The program code of integrated development environment 331 may be executed to provide a user interface and functionality which facilitates the development of program code by a developer. Such developed program code may be stored as object code 334 in storage device 330. Development of program code may include code libraries, versioning tools and other tools which are known in the art but not illustrated in FIG. 3.

Storage device 330 also stores program code of transpiler 332 and compiler 333. Generally, transpiler 332 may be executed to convert object code of one coding language specification to another coding language specification. Compiler 333, in contrast, may also be executed to convert code of a first coding language specification to a second coding language specification, but the second coding language specification is a lower-level language than the first coding language specification (e.g., object code to byte code, object code to machine-language code, etc.) Accordingly, storage device 330 also stores transpiled object code 335 and compiled classes 336. Embodiments are not limited to code development, code transpiling and code compiling on a single computing system.

Returning to process 200, a code developer may utilize integrated development environment 331, in conjunction with input device(s) 340 (e.g., a keyboard and a mouse) and output device(s) 350 (e.g., one or more computer monitors) to create object code including one or more objects. According to the present example, at least one of the objects includes a function, and is intended to be transferable between execution threads at runtime.

Example object Y including a function is set forth below. Object Y may have been generated by a developer operating a text editor of integrated development environment 331

```
Y={
  a: [ ],
  b: {
    c: "some text"
    d: 99
  },
  e: 0,
  f: function( ){
    e++;
  },
}
```

Next, at S220, the object code of the identified object is annotated. For example, the developer may further operate the text editor of integrated development environment 331 to insert an annotation indicating that object Y includes a function f and is intended for transfer between execution threads.

In some embodiments, the object is written in JavaScript and the intended runtime virtual machine is a JavaScript Runtime Environment. According to these protocols, the Transferable interface represents an object that can be transferred between different execution threads (e.g., between a main thread and Web workers). The Transferable interface is an abstract interface and does not define any method or property; it is a tag indicating objects that can be used in specific conditions, such as being transferred to a worker using the Worker.postMessage( )method. Using the example above, the function f is annotated at S220 as described above with the "transferable" directive.

```
Y={
  a: [ ],
  b: {
    c: "some text"
    d: 99
  },
  e: 0,
  f: function( )
    "transferable";
    e++;
  }
}
```

Figure 4:
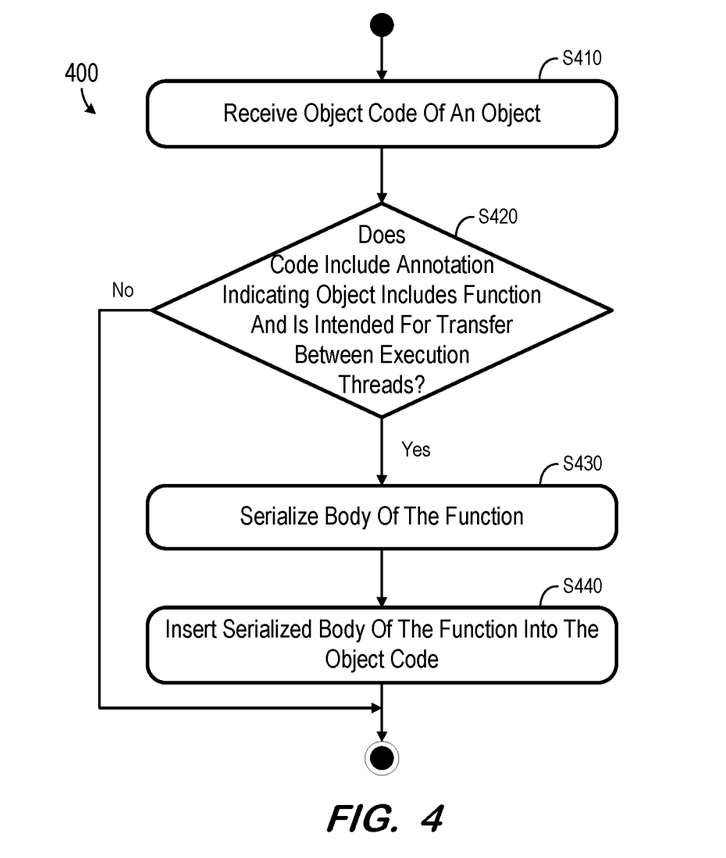
FIG. 4 is a flow diagram of a process according to some embodiments.

Transpilation of the object code is initiated at S230. For example, a developer may instruct transpiler 332 to transpile the object code (and any other associated object code). FIG. 4 is a flow diagram of process 400 to transpile an object according to some embodiments.

Process 400 may comprise only a portion of a full transpiling process. For example, the transpiling process may be intended to convert the object code from a more-recent specification to an older specification, and process 400 is merely a small part of that overall process. Insertion or modification of transpiler processes may be granted by transpiler 332 via hooks in the compilation process. For example, the Babel transpiler (https://babeljs.io/) is a Javascript transpiler granting such compilation-time access.

At S410, object code of an object is received. In this regard, it is assumed that each object in all of the code to be transpiled is subjected to process 400, but embodiments are not limited thereto. At S420, it is determined whether the code includes an annotation indicating that the object includes a function and is intended for transfer between execution threads. S420 therefore determines the existence of whatever annotation was inserted at S220 of process 200. If no such annotation exists, process 400 exits and transpiling continues as otherwise intended.

If the determination at S420 is positive, flow proceeds to S430 to serialize the body of the function. In the present example, the function is:

```
f: function( )
  "transferable";
  e++;
}
```

Accordingly, the serialized version thereof may be represented as: "function( ) "transferable"; e++;}". Embodiments may comprise any other suitable serialization protocol.

Next, the serialized body of the function is inserted as text into the object code. Insertion may include inserting an identifier which identifies the insertion as a serialized function. In the example below, the identifier is "f_function-Text=".

```
Y={
  a: [ ],
  b: {
    c: "some text"
    d: 99
  },
  e: 0,
  f: function( ){
    "transferable";
    e++;
  f_functionText="function( ){"transferable"; e++;}"
}
```

According to some embodiments, the thusly-transpiled object code is then compiled to an executable format. For example, compiler 333 may be executed to compile Javascript code output by transpiler 332 (i.e., transpiled object code 335) into a Java .class bytecode file (i.e., compiled classes 336) as is known in the art.

Figure 5:
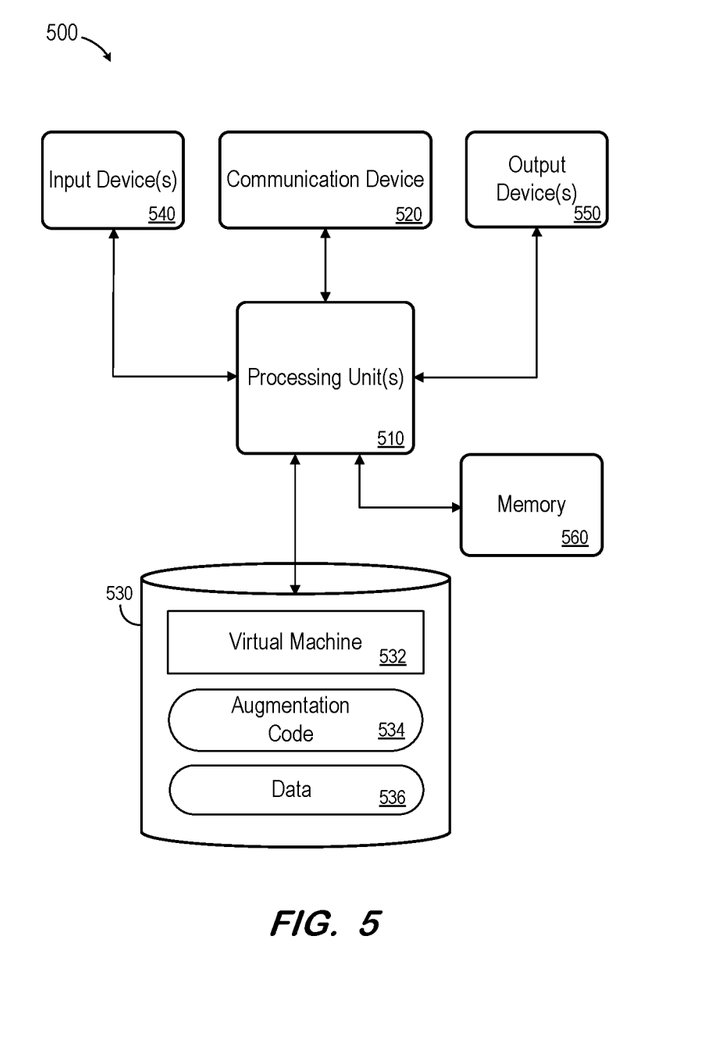
FIG. 5 is a block diagram of a runtime client system according to some embodiments.

The compiled object code is executed at runtime by a client system such as client system 110. Client system 500 of FIG. 5 is a block diagram of such a client system. Processing unit(s) 510 may execute program code of virtual machine 532 to execute applications written therefor. One or more methods provided by virtual machine 532 may be augmented by augmentation code 534 as will be described below. According to some embodiments, storage device stores program code of a client application (e.g., a Web browser) which implements virtual machine 532.

Figure 6:
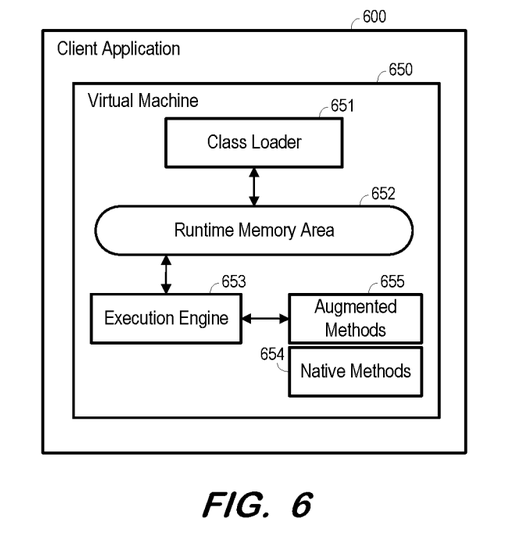
FIG. 6 is a functional block diagram of a runtime architecture according to some embodiments.

In this regard, FIG. 6 illustrates a functional block diagram of client application 600 including virtual machine 650. Virtual machine 650 includes class loader 651, runtime memory area 652, execution engine 653, native methods 654, and augmented methods 654. Virtual machine 650 may include other functional modules, and each illustrated functional module may include various sub-modules as is known in the art.

In operation, class loader 651 loads, links and initializes a class file when it is first referred to at runtime. Runtime memory area 652 stores class level data, including static variables, and all objects and their corresponding instance variables and arrays. The data and objects are accessible by multiple threads and is therefore not thread safe. However, a separate runtime stack memory is created in area 652 for every thread. All local variables will be created in the stack memory and, for every method call, one entry will be made in the stack memory. Each thread will be associated with a separate PC register, to hold the address of the current executing instruction. Once the instruction is executed the PC register will be updated with the next instruction.

Execution engine 653 executes the .class bytecode using the data and information of memory area 652. Execution engine 653 may comprise an interpreter to interpret and execute the bytecode line-by-line, and/or a Just-In-Time compiler to compile the entire bytecode into reusable native code. Execution engine 653 uses a library of native methods 654 to execute the bytecode. As is known in the art, the library of native methods 654 may be augmented by augmented methods 655. Examples of augmented methods 655 will be described below.

Figure 7:
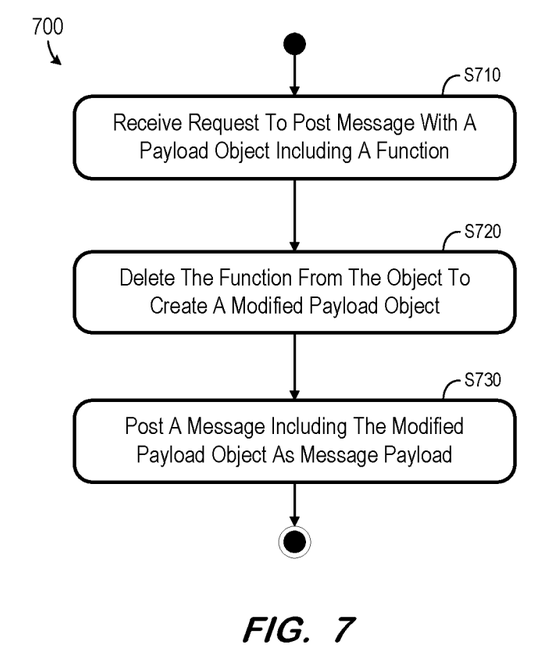
FIG. 7 is a flow diagram of a process according to some embodiments.

FIG. 7 illustrates runtime process 700 according to some embodiments. Process 700 may be executed by the execution engine of a runtime environment. Initially, at S710, a request is received to post a message for which the message payload is an object including a function. The request may be received from a main execution thread or a worker thread according to some embodiments.

In some implementations, a worker thread is an object created using a constructor (e.g. Worker( ) that runs a JavaScript file containing the code that will run in the worker thread. Data is sent between threads via messages. According to Java Virtual Machine protocols, a sender sends its messages using the postMessage( )method of native methods 654, and the receiver responds to messages via the onmessage event handler of native methods 654. Accordingly, at S710, a sending thread may call the postMessage( )method with respect to a payload object including a function.

At S720, the function is deleted from the payload object to create a modified payload object. Although the function is deleted, the textual representation inserted at S440 of process 400 is maintained. Assuming that the request postMessage(Y) is received at S710, example object Y is modified as follows at S720:

```
Y={
  a: [ ],
  b: {
    c: "some text"
    d: 99
  },
  e: 0,
  f_functionText="function( ){"transferable"; e++;}"
}
```

A message is then posted at S730 having the modified object as its payload. Since Y has been modified to be a plain Javascript object without functions, the virtual machine will allow it to be transferred between threads using the native method (e.g., post Message).

According to some embodiments, S720 comprises pre-processing the original payload object before transferring it using the native postMessage method at S730. Pre-processing may be accomplished by augmenting the sender's existing postMessage method as follows:

```
Window.originalPostMessage=Window.postMessage;
Window.postMessage=function(message,   targetOrigin,
transfer) {
  Object.keys(message).forEach(function(key){
    if (typeof message [key] ==="function"){
      delete message [key];
    }
  })
  Window.originalPostMessage(message,   targetOrigin,
    transfer);
}
```

Accordingly, a call to postMessage results in a preliminary process to delete any function within the payload object and then the native postMessage is executed with respect to the modified payload object.

Figure 8:
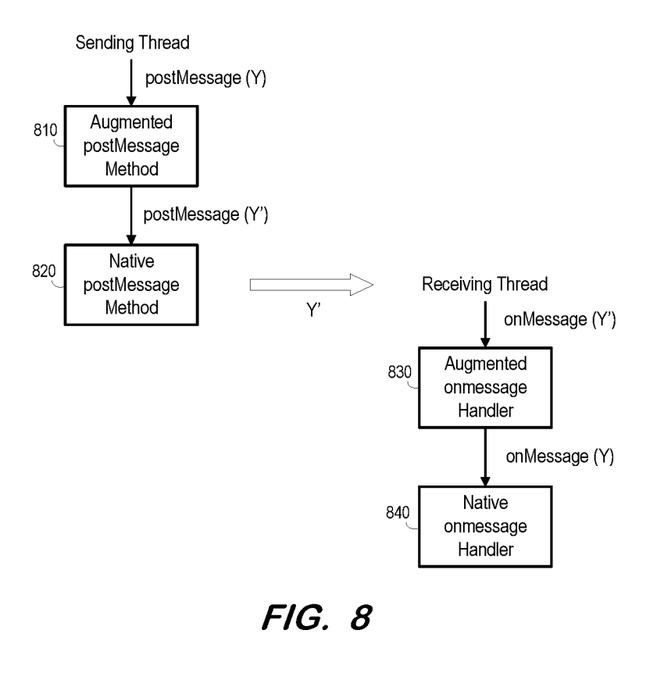
FIG. 8 illustrates runtime processing according to some embodiments.

FIG. 8 illustrates process 700 according to some embodiments. As shown, a sending thread calls postMessage Y. The call is intercepted by augmented method 810, which deletes the function of object Y to create object Y' and calls native postMessage method 820 on modified object Y' to transfer Y' to a receiving thread.

Figure 9:
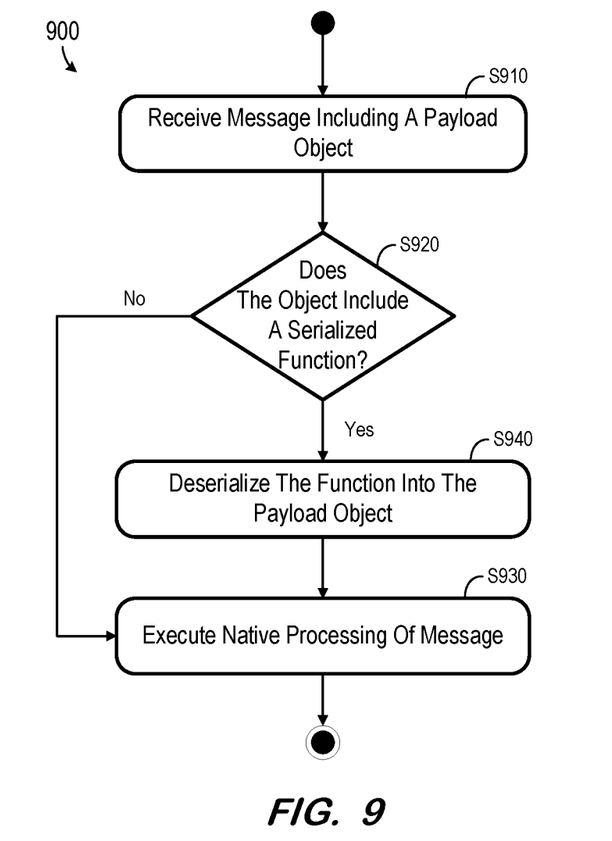
FIG. 9 is a flow diagram of a process according to some embodiments.

FIG. 9 is a flow diagram of process 900 to be executed at a receiving thread according to some embodiments. Initially, a message including a payload object is received at S910. It is determined at S920 whether the object includes a serialized function such as that described above. If not, flow continues to S930 to process the message using the native handler (e.g., onmessage).

If it is determined at S920 that the payload object includes a serialized function, the function is deserialized and the deserialized version is inserted into the payload object. Continuing the above example, the new payload object may be as follows:

```
Y={
  a: [ ],
  b: {
    c: "some text"
    d: 99
  },
  e: 0,
  f: function( ){
  "transferable";
    e++;
  },
  f_functionText="function( ){"transferable"; e++;}"
}
```

The message including the now-reconstituted object is then processed natively at S930. Since the object includes the function, the receiver thread may execute the function if desired. In one example of S930, in which transferredObject includes the deserialized function:

```
Onmessage=function(transferredObject) {
  var Y=transferredObject;
  //execution of the function f defined in Y
  Y.f( );
}
```

In some implementations, and analogous to the preprocessing at the sender thread described above, the onmessage handler is augmented to recreate the function from its textual representation. For example:

```
Window.originalOnmessage=Window.onmessage;
Window.onmessage=function(transferredObject) {
  Object.keys(transferredObject).forEach(function(key){
    if (typeof objectWithFunction[transferredObject]
        ==="string"
        && key.contains("_functionText")){
      transferredObject [key]=eval(transferredObject
        [key]);
    }
  })
  Window.originalOnmessage(transferredObject);
}
```

Accordingly, invoking the onmessage handler results in execution of a preliminary process to deserialize and insert any function within the payload object, and then execution of the native onmessage handler with respect to the reconstructed payload object. In the above example, the augmented method recreates function f from its textual representation by calling JavaScript's eval method on f_functionText. The argument of the eval( ) function is a string. If the argument represents one or more JavaScript statements, eval( ) evaluates the statements.

FIG. 8 also illustrates an example of process 900 according to some embodiments. The receiving thread executes augmented onmessage handler 830 with respect to transferred object Y', which deserializes and re-inserts the serialized function of object Y' to create object Y and calls native onmessage handler 840 on object Y. The functions of object Y may thereafter be executed by the receiving thread.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a memory storing processor-executable process steps; and
   a processor to execute the processor-executable process steps to:
      receive a request from a first execution thread to post a message to a second execution thread, a payload of the message comprising an object including a function and serialized text of the function;
      in response to the request:
         delete the function from the object to create a modified object; and
         call a method to post a second message to the second execution thread, a payload of the second message comprising the modified object and the serialized text of the function;
      receive a request from the second execution thread to handle the second message;
      deserialize the serialized text of the function; and
      insert the deserialized text of the function into the modified object to generate a fourth object.

2. A system according to claim 1, the processor to execute the processor-executable process steps to:
   call a handler to handle the second message, wherein a payload of the second message comprises the fourth object.

3. A system according to claim 2, the processor to execute the processor-executable process steps to:
   execute the function in the second execution thread.

4. A system according to claim 1, wherein deserialization of the serialized text comprises:
   determination of whether the second message includes serialized text of a function.

5. A system according to claim 4, wherein deserialization and insertion are performed by execution of process steps of an augmentation to a native message handler.

6. A system according to claim 5, wherein deletion of the function from the object and calling of the method are performed by execution of process steps of an augmentation to a native message posting method.

7. A system according to claim 1, wherein deserialization and insertion are performed by execution of process steps of an augmentation to a native message handler, and wherein deletion of the function from the object and calling of the method are performed by execution of process steps of an augmentation to a native message posting method.

8. A computer-implemented method comprising:
receiving a request from a first execution thread to post a message to a second execution thread, a payload of the message comprising an object including a function and serialized text of the function;
in response to the request:
  deleting the function from the object to create a modified object; and
  calling a method to post a second message to the second execution thread, a payload of the second message comprising the modified object and the serialized text of the function;
receiving a request from the second execution thread to handle the second message; and
in response to the second request from the second execution thread:
  deserializing the serialized text of the function; and
  inserting the deserialized text of the function into the modified object to generate a fourth object.

9. A method according to claim 8, further comprising:
calling a handler to handle the second message, wherein a payload of the second message comprises the fourth object.

10. A method according to claim 9, further comprising:
executing the function in the second execution thread.

11. A method according to claim 8, wherein deserializing the serialized text comprises:
determining whether the second message includes serialized text of a function.

12. A method according to claim 11, wherein deserializing and inserting are performed by executing an augmentation to a native message handler.

13. A method according to claim 12, wherein deleting the function from the object and calling of the method are performed by executing an augmentation to a native message posting method.

14. A method according to claim 8, wherein deserializing and inserting are performed by executing an augmentation to a native message handler, and
  wherein deleting the function from the object and calling the method are performed by executing an augmentation to a native message posting method.

15. A system comprising:
a development system to:
  annotate object code of an object with an identifier to indicate that the object is transferable between threads; and
  to execute a transpiler to:
  determine that the annotated object code is transferable between threads and includes a function; and
  based on the determination, serialize the body of the function and insert the serialized body as a text property of the object, to generate a modified object; and
a runtime system to:
  receive a request from a first execution thread to post a message to a second execution thread, a payload of the message comprising the modified object;
  in response to the request:
    delete the function from the modified object to create a second modified object; and
    call a method to post a second message to the second execution thread, a payload of the second message comprising the second modified object;
  receive a request from the second execution thread to handle the second message; and
  in response to the second request from the second execution thread:
    deserialize the serialized body of the function; and
    insert the deserialized body of the function into the second modified object to generate a received object.

16. A system according to claim 15, the runtime system further to call a handler to handle the second message, wherein a payload of the second message comprises the fourth object.

17. A system according to claim 16, the runtime system further to execute the function in the second execution thread.

18. A system according to claim 15, wherein deserializing the serialized body comprises:
determining whether the second message includes the serialized body of a function.

19. A system according to claim 18, wherein deserializing and inserting are performed by executing an augmentation to a native message handler.

20. A system according to claim 19, wherein deleting the function from the object and calling of the method are performed by executing an augmentation to a native message posting method.

* * * * *